UNITED STATES PATENT OFFICE.

WILLIAM GEORGE DEVINS ORR, OF GALESBURG, ILLINOIS.

COMPOSITION OF MATTER FOR SURFACING ROADS.

1,261,845.     Specification of Letters Patent.     Patented Apr. 9, 1918.

No Drawing.     Application filed April 27, 1917. Serial No. 164,954.

*To all whom it may concern:*

Be it known that I, WILLIAM GEORGE D. ORR, a citizen of the United States, residing at Galesburg, in the county of Knox and State of Illinois, have invented certain new and useful Improvements in Composition of Matter for Surfacing Roads, of which the following is a specification.

My invention relates to a road-surfacing composition of matter for surfacing roads, walks, etc., and its object is to produce a top or wearing surface of crushed vitrified earthy material mixed with sand and a cementitious or asphaltic binding agent.

In carrying out my invention I break or crush vitrified brick, shale, fire-clay, or surface clay to such size that the pieces will pass through a screen of an inch or an inch-and-a-half mesh but will not pass through an eighth-inch screen. This material before it is crushed may be in any form, as vitrified brick, tile or other formed or molded shapes made from shale, fire-clay, surface clay or other clay substances, or vitrified shale, fire-clay, surface clay or other clay substances not molded, shaped or formed other than the form or shape obtained when digging, mining, scraping, planing, etc., the material, and it is then crushed and screened as above set forth. The term vitrified is here used in its commercially accepted meaning and sense applied to any earthy material which has been changed by heat to resemble a stony or glassy material.

The crushed and screened vitrified material is then mixed with a binding agent, preferably any Portland cement such as is now commonly used in making concrete roads and to which sand is added. The proportions of the constituents may vary within definite limits, for example I may employ one part of cement, two of sand and four of the crushed vitrified material, or one part of cement, four of sand and eight of the crushed vitrified material, or any mixture within this range or having substantially these proportions, water being added in necessary quantities to permit the mixture to be easily worked and spread. The mixing of the crushed vitrified material with the sand, cement and water may be carried out in any ordinary continuous or batch concrete mixer, and the mixture is then spread upon the prepared foundation to form a top or wearing surface of from one to three inches in thickness.

I am aware that paving compositions have been proposed by using ground or powdered clay or shale mixed with asphalt, as in patent to Rock and Phillips No. 192,349 dated June 26, 1877, and impure fire-clay mixed and blended while in a heated state with slag and other materials, as in patent to Lee No. 392,614, dated Nov. 13, 1888, and that building compounds have been proposed employing ground or pulverized common brick or burnt clay with other ingredients, as in patents to Olsen and Gabriel No. 403,548, dated May 21, 1889, and to Stevenson No. 836,223, dated Nov. 20, 1906; but in all such instances the clay or shale or brick is not vitrified and is in powdered form, and hence is not suitable for producing my invention. I am also aware that crushed granite mixed with cement has been commonly employed for road surfaces, but my invention is cheaper and superior to the granite compositions, as for example with respect to uniform hardness, uniform color, and the absence of any material likely to disintegrate from exposure to the elements.

I claim:—

1. A composition for surfacing pavements consisting substantially of vitrified earthy material crushed to size to pass through a screen having a mesh of an inch and to be retained on a screen having a mesh of an eighth of an inch, and a binding agent, mixed in the proportions of from four to eight parts of the former for each part of the latter.

2. A composition for surfacing pavements consisting of substantially one part of cement, a plurality of parts of sand, and twice as many parts of vitrified brick as of sand crushed to size to pass through a screen having a mesh of an inch and to be retained on a screen having a mesh of an eighth of an inch.

In testimony whereof I affix my signature in presence of two witnesses.

WILLIAM GEORGE DEVINS ORR.

Witnesses:
F. G. MATTESON,
IDRIS NELSON.

Copies of this patent may be obtained for five cents each, by addressing the "Commissioner of Patents, Washington, D. C."